March 11, 1941.  F. C. DALTON  2,234,519
SPLIT SKIRT PISTON EXPANDER
Filed May 15, 1939

Inventor
Frederick C. Dalton
By Dieterich & Rutley
Attorneys

Patented Mar. 11, 1941

2,234,519

UNITED STATES PATENT OFFICE 2,234,519

SPLIT SKIRT PISTON EXPANDER

Frederick C. Dalton, Portland, Oreg.

Application May 15, 1939, Serial No. 273,771

2 Claims. (Cl. 309—12)

My invention relates to the art of internal combustion engines and, more particularly, it deals with split skirt pistons.

The present invention has for its objcet to provide another embodiment of the generic invention disclosed and claimed in my Patent No. 2,168,601, issued August 8, 1939, by which embodiment the generic idea is more readily adapted to pistons already on the market.

The present invention resides in the provision of a separate lug for attachment to the skirt of the piston to receive the pointed end of the expander screw.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawing, in which—

Fig. 7 is an enlarged detail vertical section later again referred to.

Figure 1:
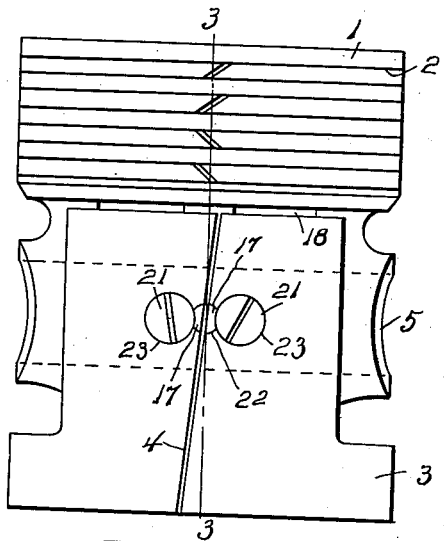
Fig. 1 is a side elevation of a piston embodying the present invention.

In the drawing, in which like numbers indicate the same parts in all the figures, 1 is the head of the piston which has ring grooves 2; the skirt 3 is split at 4 and separated from the head at 18 and joined thereto at 19. The piston pin bosses are indicated by 5.

Projecting inwardly at each side of the split 4 is a lug 6. These lugs constitute a boss or guide for the tapered end 11 of the adjusting screw 10, the boss being tapered out, at 7, to fit the screw end.

Figure 3:
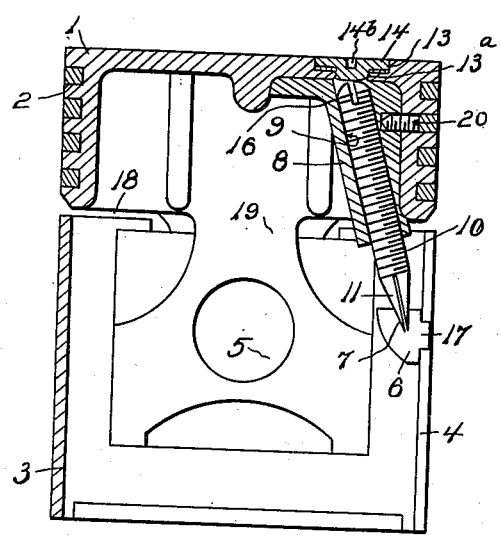
Fig. 3 is a section on the line 3—3 of Fig. 1.
Figure 2:
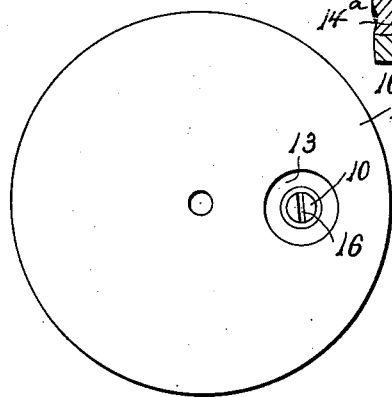
Fig. 2 is a top plan view thereof.
Figure 4:
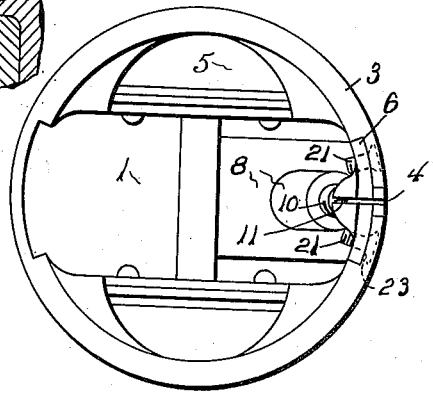
Fig. 4 is an inverted plan view of the piston shown in Figs. 1 to 3, inclusive.
Figure 6:
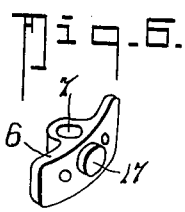
Fig. 6 is a detail perspective view of a lug before attachment to the piston skirt and before being sawn in two.
Figure 5:
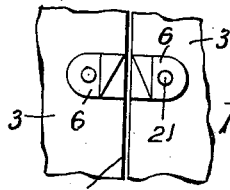
Fig. 5 is a detail elevation, from inside the piston, of a portion thereof.

The screw 10 is threaded into the boss 8 which, in the form of the invention shown in Figs. 1 to 4, inclusive, is made separate from the head and land of the piston (see Fig. 3), the boss 8 being threaded at 9 for the purpose of receiving the screw.

The screw 10 has a suitable tool receiving kerf or recess 16 at its upper end, while at its lower end it has a tapered or conical portion 11 that is slit two ways at right angles, as at 12 (Fig. 3), dividing such portion into four parts. This screw is made of special steel that will cause the four parts to possess spring-tension when the end 11 is screwed down in the boss 6—6. By providing the split 12 the tapered end is rendered resilient so as to permit normal expansion and contraction of the skirt due to temperature changes without disturbing the setting of the screw and its adjustment effect on the skirt.

The boss 8 is held in place by a screw 20 entering from one of the ring grooves 2.

The head 1 at the upper end of the threaded boss 8 is counterbored, as at 13, and threaded, as at 13ª, to receive the screw plug 14 that serves as a lock for the adjusting screw 10, and has a tool receiving recess 14ᵇ. One or more thin washers 15 are provided so that as the screw 10 is advanced, by removing a washer (when a plurality of washers are used) or replacing a thick washer with a thinner one, the end 14ª of plug 14 will contact screw 10 and hold it against unscrewing. The washers 15 also serve as a seal to prevent gas and oil passing through the piston head.

Should the piston wear, as it does in the course of several thousand miles, all one would have to do is to take out screw 14 and turn down adjusting screw 10 to the right tension desired. This can be done with a tool inserted down through the spark plug hole, or some other opening at the necessary place in the head of the engine, thereby saving much time and expense.

In the present invention the skirt 3 is drilled at 22 to receive the projection 17 of the lug 6. It is also drilled and countersunk at 23 for the screws 21 which hold the lug in place.

After securing the lug 6 to the piston's skirt 3 it is then sawn across along the split 4 to the same width as the split, thereby dividing the lug into two parts each of which is held in place by a screw 21. This makes it easy to manufacture and place the lugs on pistons already cast.

From the foregoing description, taken in contion with the accompanying drawing, it is thought that the construction and advantages of the invention will be clear to those skilled in the art to which it relates.

What I claim is:

1. In a split skirt piston, a spreader screw carried by the head of the piston and a two part lug carried by the skirt of the piston, said lug comprising body parts having between them a tapered seat for said screw, and means to secure said lug in place on the skirt of the piston, said lug having its parts spaced to correspond with the split of the piston skirt.

2. In a split skirt piston, a spreader screw carried by the head of the piston and a two part lug carried by the skirt of the piston, said lug comprising body parts having between them a tapered seat for said screw, means to secure said lug parts in place on the skirt of the piston, said lug having its parts spaced to correspond with the split of the piston skirt, the piston having a hole, said means comprising projections on the lug parts to fit said hole, and screws passed through holes in the skirt of the piston on each side of the split and threaded into holes in the lug parts.

FREDERICK C. DALTON.